INVENTORS
HAROLD V. HANSEN
HARRY M. MEINERT

INVENTORS.
HAROLD V. HANSEN
HARRY M. MEINERT

United States Patent Office 3,488,061
Patented Jan. 6, 1970

3,488,061
TANK MOUNTING ATTACHMENT FOR
AGRICULTURAL TRACTOR
Harold Valentine Hansen, Cordova, Ill., and Harry
Mathais Meinert, Des Moines, Iowa, assignors to
Deere & Company, Moline, Ill., a corporation of
Delaware
Filed Nov. 3, 1967, Ser. No. 680,449
Int. Cl. B60p 3/22, 9/00
U.S. Cl. 280—5                                             5 Claims

ABSTRACT OF THE DISCLOSURE

An attachment for mounting a pair of tanks on an agricultural tractor, one on each side of the tractor ahead of the rear wheels, the tanks being held by separate subframes which are in turn supported by an inverted U-shaped structure adapted to fit over the forward portion of the tractor and attached to the lower side frame members thereof.

Background of the invention

This invention relates to agricultural sprayers, and more particularly to an attachment for mounting a pair of sprayer tanks on the sides of an agricultural tractor.

In the past, high capacity tanks for agricultural sprayers have almost exclusively been mounted on a trailer pulled behind a tractor and used in conjunction with a sprayer boom mounted near the rear of the tractor. While a trailer type sprayer has generally been satisfactory, they have not been well suited to use with booms mounted on the forward end of a tractor. Also, it has been necessary to provide a trailer to support the tanks.

To overcome the disadvantage of the trailer mounted tanks, sprayers have been mounted to the sides of a tractor forward of the rear wheels. In prior art designs, however, the structure supporting the tanks involved considerable work in securing to the tractor, and also, they could not support tanks of a capacity equal to that carried by the drawn trailers.

Summary of the invention

It is the principal object of the present invention to overcome the disadvantages of the prior art devices, and to this end, the present tractor tank mounting attachment utilizes a central main frame which is supported by the side frame members of the tractor, and right and left tank subframes which carry the tanks and are in turn carried by the main frame. The main frame is of an inverted U configuration such that it fits over the forward hood portion of the tractor and thus leaves the ground clearance of the tractor unobstructed. It is composed, generally, of right and left vertically extending side frames which are supported on their lower ends by brackets mounted on the lower side frame members of the tractor, fore-and-aft transverse top members which cross over the forward hood portion of the tractor, connect the two side frames and support the upper portions of the tank sub-frames, and fore-and-aft lower support arms which extend outwardly from the lower end portion of each side frame to support the lower portions of the tank subframes. The tank subframes are substantially identical and include, generally, upper and lower circular bands which extend around and hold the tanks, and fore-and-aft vertical mounting brackets which rigidly connect the upper and lower circular bands and which are supported by the transverse top members and lower support arms of the mounting attachment main frame as previously indicated.

A further object of the present invention is to provide an attachment for mounting tanks on a tractor which is strong yet compact and light in weight. It is another object of the invention to provide such a mounting attachment which does not obstruct the ground clearance of the tractor. It is a further object to provide such an attachment which is easy and inexpensive to produce.

Brief description of the drawings

The preferred embodiment of the invention will be described in conjunction with the accompanying drawings in which.

Description of the preferred embodiment

In the following description right- and left-hand reference is determined by standing at the rear of the tractor and facing forward.

Figure 1:
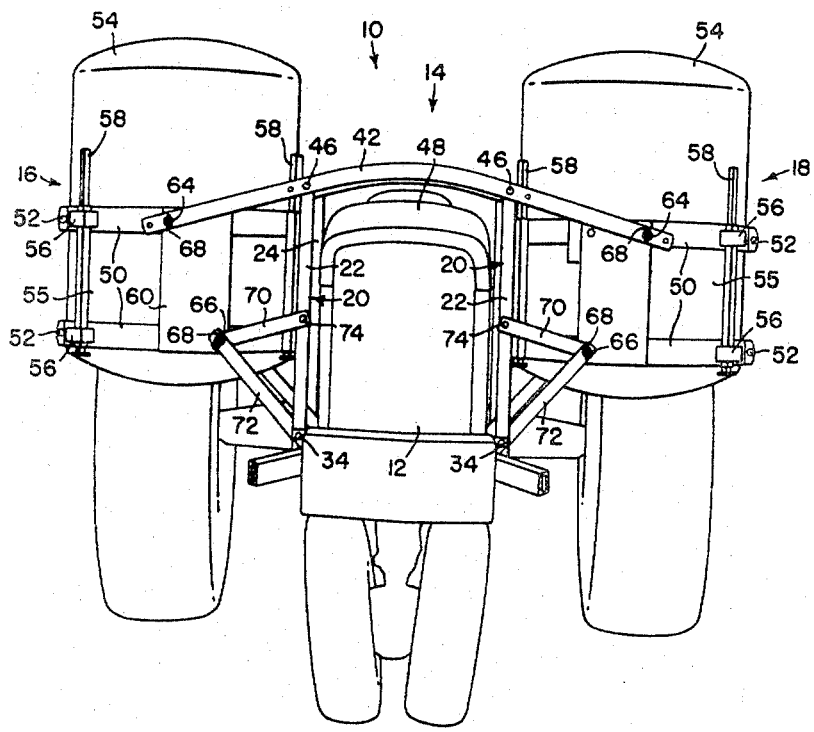
FIG. 1 is a front view of the present invention mounted on an agricultural tractor.
Figure 2:
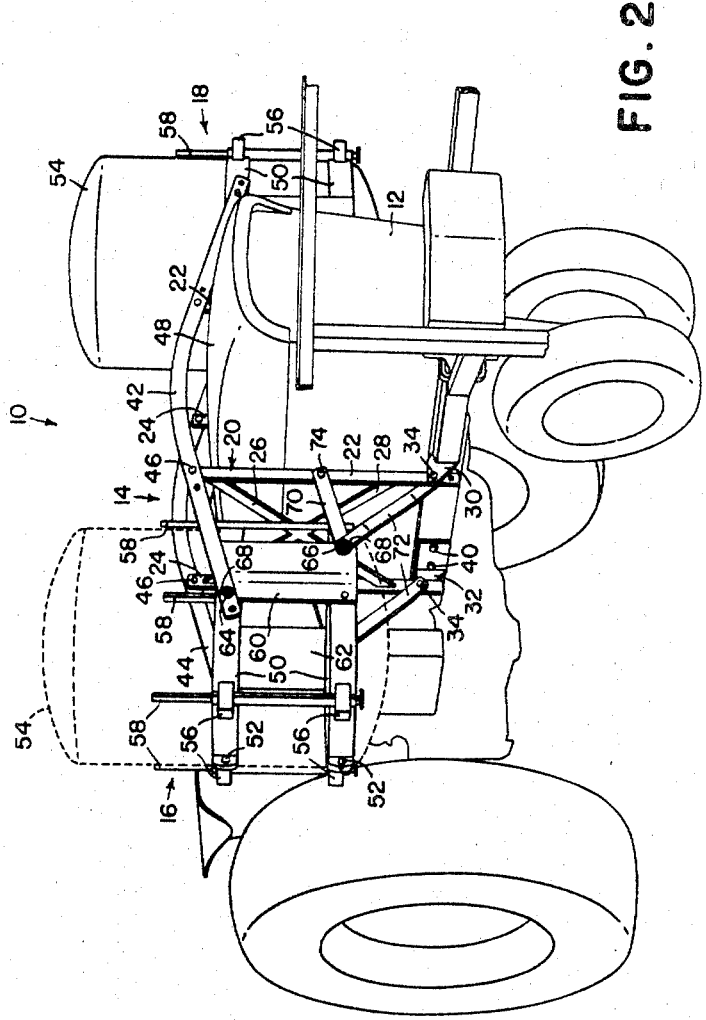
FIG. 2 is a perspective view of the invention taken from the right front of the tractor in which the right tank has been omitted for clarity.

The tank mounting attachment, indicated generally by the reference numeral 10, is mounted as shown in FIGS. 1 and 2 on the forward portion of a conventional agricultural tractor 12. The attachment, which is substantially symmetrical about both its longitudinal and transverse axes, is comprised of an inverted U-shaped main frame indicated generally at 14 and right and left tank mounting subframes indicated generally at 16 and 18, respectively.

The main frame 14 includes right and left side frames 20, each of which is composed of fore-and-aft vertical support members 22 and 24 rigidly connected by cross braces 26 and 28. The lower ends of the vertical support members are supported on fore-and-aft frame mounting brackets 30 and 32 by bolts 34. Brackets 30 and 32 are in turn mounted on the right and left frame members of the tractor 12 with bolts 40.

The upper end portions of the two forward vertical support members 22 and the two rearward vertical support members 24 are connected by fore-and-aft transversely extending top members 42 and 44 respectively, the members being rigidly held by bolts 46. The fore-and-aft top members are substantially identical, each having an arcuate middle portion disposed directly over the hood portion 48 of the tractor 12, and end portions which extend outwardly and downwardly from the arcuate middle portion.

As shown in FIG. 2, the right tank subframe 16, of which the left subframe 18 is a mirror image, includes upper and lower circular bands 50 which are capable of being adjusted with bolts 52 so as to releasably hold cylindrical tank 54. Each of the tanks 54 is provided with a circumferential bead 55, the lower edge of which sits on the top edge of the lower band 50. Four stand brackets 56 are equally spaced around the outer circumference of each of the bands 50; the corresponding brackets on the upper and lower bands are vertically aligned to hold adjustable stands 58. The circular bands 50 are rigidly connected by fore-and-aft tank subframe mounting brackets 60 and 62 respectively.

Each of the subframe mounting brackets 60 and 62 includes upper and lower support pins 64 and 66, respectively, each having retaining pins 68 for mounting the tank subframe on the main frame 14. The upper support pins 64 are received by suitable apertures in the outer end portions of the fore-and-aft transverse top members 42 and 44, while the lower support pins 66 are received by suitable apertures in the outer end portions of upper and lower support arms 70 and 72, respectively. The upper support arm 70 extends upwardly and inwardly from the pin 66 to the middle portion of its respective vertical support member 22 where it is rigidly attached with bolt 74, while the lower support arm 72 extends downwardly and inwardly to its respective frame mounting bracket, where it is rigidly mounted by bolt 34 along with its respective vertical support member.

By employing the structure described above, a pair of relatively large tanks can be quickly secured and quickly removed from a midportion of a tractor. To mount the tanks, it is only necessary to secure the fore-and-aft mounting brackets 30, 32 to the right and left frame members of the tractor with bolts 40. After the mounting brackets 30, 32 have been secured, the main frame 14 (including support arms 70, 72) is bolted to the mounting brackets by four bolts 34. The tanks 54 with their mounting structures 16 and 18 are then secured to the frame 14 by pins 64, 66.

While the preferred embodiment of the present invention has been shown and described above, it is to be understood that the invention is not to be limited to the particular details of the structure shown and described, but that, in fact, widely different means may be employed without departing from the broad aspects of the invention.

We claim:

1. In combination with an agricultural tractor having lower side frame members, vertical sides, and a hood portion, a tank mounting attachment comprising: an inverted U-shaped structure having vertical sides, an upper closed end portion, and lower ends, the vertical sides of said structure being disposed adjacent to and parallel to the vertical sides of said tractor, the closed end portion of said structure passing over the hood portion of said tractor, and the lower ends of said structure being rigidly mounted on the lower side frame members of said tractor; and, tank mounting means, said tank mounting means being disposed adjacent to the vertical sides of said inverted U-shaped structure and supported thereby.

2. The invention described in claim 1 further characterized by said tank mounting means having fore-and-aft mounting brackets, said tank mounting means being centered longitudinally on said inverted U-shaped structure.

3. In combination with an agricultural tractor having right and left longitudinally extending lower frame members, rear wheels, vertical sides, and an upper hood portion, a tank mounting attachment comprising: right and left side frames, each of said side frames having fore-and-aft vertically extending support members rigidly held in spaced-apart relationship, said support members having upper and lower end portions, said lower end portions being rigidly mounted on the longitudinally extending frame members of the tractor forwardly of said rear wheels; fore-and-aft top members extending transversely above the hood portion of said tractor and extending outwardly beyond the vertical sides of said tractor, said fore-and-aft top members being rigidly attached to and connecting the upper end portions of the corresponding fore-and-aft vertical support members; tank mounting means adjacent both sides of said tractor centered longitudinally between said fore-and-aft support members and top members, said tank mounting means having fore-and-aft mounting brackets with upper and lower portions, said upper portions being rigidly attached to said fore-and-aft top members; and, fore-and-aft support arm means, said support arm means rigidly connecting the lower portions of said fore-and-aft mounting brackets with the corresponding fore-and-aft vertical support members.

4. The invention described in claim 3 in which each support arm means comprises upper and lower support arms, there being first fastening means located on said tank mounting means to secure one end of each pair of upper and lower support arms to each other and to the tank mounting means, there being said second fastening means located on said vertical support member being vertically spaced apart, said lower support arm extending downwardly and inwardly from said first fastening means to the lower end portion of said vertical support member, said lower support arm being rigidly attached thereto by said second fastening means of said lower support arm, said upper support arm extending upwardly and inwardly from said mutual first fastening means to said vertical support member, said upper support arm being rigidly attached thereto by said second fastening means of said upper support arm.

5. The invention described in claim 3 in which each transversely extending top member has a middle portion and end portions, said middle portion being arcuate, said end portions extending outwardly and downwardly from said arcuate middle portion, each of said top members being rigidly attached to the upper end portions of the corresponding vertical support members substantially between said arcuate middle portion and said tangential end portions.

References Cited

UNITED STATES PATENTS

| | | | |
|---|---|---|---|
| D. 141,908 | 7/1945 | Prior | D14—6 |
| 2,109,384 | 2/1938 | Gallupe | 239—172 X |
| 2,424,468 | 7/1947 | Keathley | 239—172 X |
| 2,743,934 | 5/1956 | Chambers et al. | 280—5 |

LEO FRIAGLIA, Primary Examiner

U.S. Cl. X.R.

239—172